US011645266B2

(12) United States Patent
Donnelly et al.

(10) Patent No.: US 11,645,266 B2
(45) Date of Patent: May 9, 2023

(54) AUTOMATED PINNING OF FILE SYSTEM SUBTREES

(71) Applicant: Red Hat, Inc., Raleigh, NC (US)

(72) Inventors: Patrick Donnelly, Sunnyvale, CA (US); Sidharth Anupkrishnan, Chennai (IN)

(73) Assignee: Red Hat, Inc., Raleigh, NC (US)

( * ) Notice: Subject to any disclaimer, the term of this patent is extended or adjusted under 35 U.S.C. 154(b) by 321 days.

(21) Appl. No.: 16/992,694

(22) Filed: Aug. 13, 2020

(65) Prior Publication Data

US 2022/0050819 A1 Feb. 17, 2022

(51) Int. Cl.
*G06F 16/23* (2019.01)
*G06F 16/182* (2019.01)

(52) U.S. Cl.
CPC ........ *G06F 16/2365* (2019.01); *G06F 16/182* (2019.01)

(58) Field of Classification Search
CPC ............................ G06F 16/2365; G06F 16/182
USPC .......................................................... 707/690
See application file for complete search history.

(56) References Cited

U.S. PATENT DOCUMENTS

| 10,140,304 | B1* | 11/2018 | Bent | G06F 16/13 |
|---|---|---|---|---|
| 2002/0152195 | A1* | 10/2002 | Bills | G06F 16/1815 |
| 2006/0004765 | A1* | 1/2006 | Anderson | G06F 16/10 |
| 2006/0212531 | A1* | 9/2006 | Kikkawa | H04L 65/611 |
| | | | | 709/217 |
| 2007/0233710 | A1* | 10/2007 | Passey | G06F 16/182 |
| 2008/0059541 | A1* | 3/2008 | Fachan | G06F 16/174 |
| 2010/0161657 | A1* | 6/2010 | Cha | G06F 16/134 |
| | | | | 707/E17.014 |
| 2011/0246491 | A1* | 10/2011 | Clash | G06F 16/1827 |
| | | | | 707/755 |
| 2013/0218934 | A1* | 8/2013 | Lin | G06F 16/182 |
| | | | | 707/828 |
| 2013/0339466 | A1* | 12/2013 | Mayhew | G06F 3/0604 |
| | | | | 709/212 |

(Continued)

FOREIGN PATENT DOCUMENTS

CN 106598744 4/2017

OTHER PUBLICATIONS

An Improvement of Static Subtree Partitioning in Metadata Service Cluster; Zhipeng, et al.; Hindawi Publishing Corporation; International Journal of Distributed Sensor Networks; vol. 2012, Article ID 835616; Sep. 20, 2012, retrieved Jul. 28, 2020; pp. 1-10.

(Continued)

*Primary Examiner* — James Trujillo
*Assistant Examiner* — Fariborz Khoshnoodi
(74) *Attorney, Agent, or Firm* — K&L Gates LLP

(57) ABSTRACT

Methods and systems for improved pinning of file system subtrees are provided. In one aspect, a method is provided that includes receiving an identifier of a base directory within a file system tree. A plurality of subnodes of the base directory may be identified within the file system tree. At least a subset of the subnodes may be temporarily pinned to a plurality of metadata servers (MDSs). Pinning each respective subnode of the at least a subset of subnodes may include hashing an identifier of the respective subnode to generate a hashed value corresponding to a particular MDS and assigning the particular MDS to store and manage metadata for a subdirectory associated with the respective subnode.

19 Claims, 7 Drawing Sheets

(56) References Cited

U.S. PATENT DOCUMENTS

| | | | | |
|---|---|---|---|---|
| 2014/0059094 A1* | 2/2014 | Shankar | ............... | G06F 16/13 |
| | | | | 707/827 |
| 2014/0281180 A1* | 9/2014 | Tune | ............... | G06F 12/0833 |
| | | | | 711/146 |
| 2016/0321287 A1* | 11/2016 | Luthra | ............... | H04L 67/06 |
| 2019/0208014 A1* | 7/2019 | Goldberg | ............ | G06F 21/604 |
| 2019/0213268 A1* | 7/2019 | Donnelly | ............... | G06F 3/06 |
| 2021/0349853 A1* | 11/2021 | Duttagupta | ......... | G06F 16/162 |

OTHER PUBLICATIONS

Dynamic Metadata Management for Petabyte-scale File Systems; Weil et al.; 0-7695-2153-3/04 2004 IEEE; 12 pages.

A Fast, Minimal Memory, Consistent Hash Algorithm; Lamping et al.; Google; https://arxiv.org/pdf/1406.2294.pdf; retrieved Jul. 28, 2020; pp. 1-12.

Design and Implementation of the Sun Network File System; Sandberg et al.; USENIX Annual Technical Conference 1985; http://www.cs.cornell.edu/courses/cs6464/2009sp/lectures/03-nfs.pdf; retrieved Aug. 13, 2020; 26 pages.

Volumes: The Andrew File System Data Structuring Primitive; Sidebotham; The Information Technology Center Carnegie-Mellon University; 1986; http://ra.adm.cs.cmu.edu/anon/home/ftp/usr0/ftp/itc/CMU-ITC-053.pdf; Retrieved Aug. 13, 2020; 8 pages.

Coda: A Highly Available File System for a Distributed Workstation Environment; Satyanarayanan et al; IEEE Transactions on Computers, vol. 39, No. 4, Apr. 1990; https://www.cs.cmu.edu/~satya/docdir/satya-ieeetc-coda-1990.pdf; retrieved Aug. 13, 2020; 13 pages.

The Sprite Network Operating System; Ousterhout et al.; Computer Science Division; Department of Electrical Engineering and Computer Sciences; University of California; https://users.soe.ucsc.edu/~sbrandt/221/Papers/Dist/ousterhout-computer88.pdf; Nov. 19, 1987; retrieved Aug. 13, 2020; 32 pages.

DNE 1 Remote Directories High Level Design; Henwood; Feb. 14, 2012; Dashboard / . . . / Remote Directories Solution Architecture; https://wiki.whamcloud.com/display/PUB/DNE+1+Remote+Directories+High+Level+Design; retrieved Aug. 13, 2020; 9 pages.

Distributed Directory Service in the Farsite File System; Douceur et. al.; https://cse.buffalo.edu/faculty/tkosar/cse710_spring14/papers/farsite.pdf; retrieved Aug. 13, 2020; 14 pages.

* cited by examiner

AUTOMATED PINNING OF FILE SYSTEM SUBTREES

BACKGROUND

Many distributed file systems allow file systems to be divided into a hierarchy of subtrees that can be managed by multiple metadata servers (MDSs). The metadata servers handle changes to the metadata of the subtrees and handle client requests to change the subtrees. These requests may include creating new directories in the file system, changing metadata for existing files or directories, or moving files between directories. MDS loads may be automatically balanced by splitting and merging subtrees and altering MDS assignments.

SUMMARY

The present disclosure presents new and innovative systems and methods for pinning subtrees in storage systems. In an example, a method includes receiving an identifier of a base directory within a file system tree. A plurality of subnodes of the base directory may be identified within the file system tree. At least a subset of the subnodes may be temporarily pinned to a plurality of metadata servers (MDSs). Pinning each respective subnode of the at least a subset of subnodes may include hashing an identifier of the respective subnode to generate a hashed value corresponding to a particular MDS and assigning the particular MDS to store and manage metadata for a subdirectory associated with the respective subnode.

In another example, a system is provided that includes a processor and a memory. The memory may store instructions which, when executed by the processor, cause the processor to receive an identifier of a new directory within a file system tree. A probabilistic check may be performed to determine whether a subnode corresponding to the new directory should be pinned. The subnode may be pinned to a particular MDS from among a plurality of MDSs if it is determined that the subnode should be pinned. Pinning the subnode may include hashing an identifier of the subnode to generate a hashed value corresponding to the particular MDS and assigning the particular MDS to store and manage metadata for the new directory.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
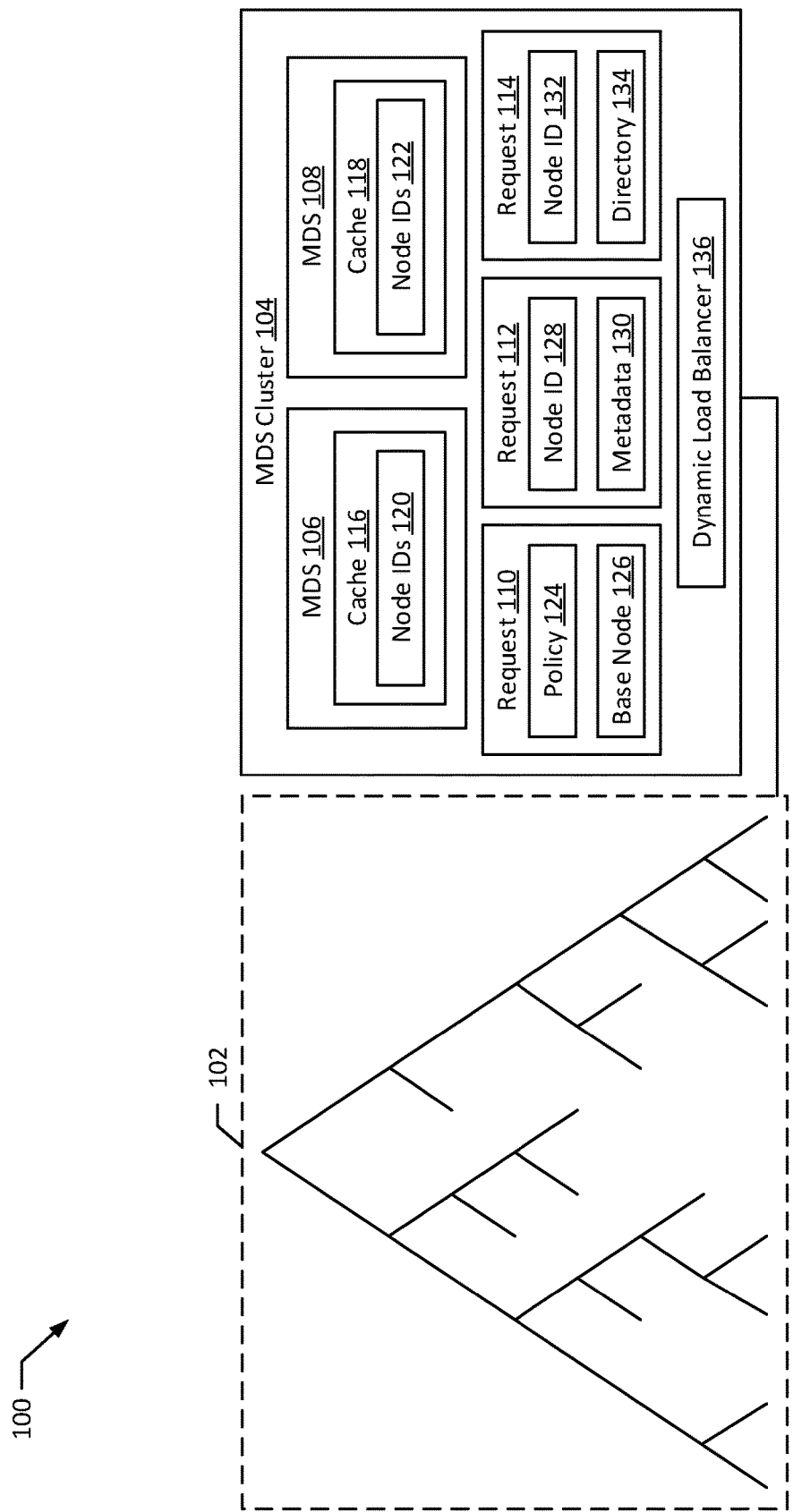
FIG. 1 illustrates a system for automatically pinning subtrees to MDSs according to an exemplary embodiment of the present disclosure.

Techniques are disclosed for pinning subtrees in a filing system. Distributed file systems, such as the CephFS from Red Hat® and the Red Hat® Cluster Suite may include dynamic load balancers that manage the assignment of subtrees to an MDS. However, these automated systems may fail when presented with certain degenerate workloads and the file system may operate better if particular MDS assignments for subtrees are made. For example, a client may be performing read operations spread across more than one MDS on subtrees that could be consolidated to a single MDS to improve file system performance. Similarly, the file system may receive many read requests from multiple clients, but each client is only accessing a single subtree. System performance may improve if each subtree were assigned to an MDS close to the client accessing it. Further, multiple clients performing create operations (e.g., directory creation operations) in different parts of the file system may confuse the dynamic load balancer, which may not properly balance the load, impeding performance. In this case, system performance may improve if subtrees were assigned to particular MDSs in order to properly balance the load. There is currently no way to make these assignments without disrupting the operation of the dynamic load balancers in the rest of the file system.

As described in the examples below, one method to address these problems is to pin file system subtrees in a way that does not disrupt the automatic load balancing system. This method may prevent a pinned subtree and its children from being reassigned by a dynamic load balancer while permitting other unpinned subtrees to be reassigned by the dynamic load balancer. Existing systems may utilize a manual pinning procedure in which requests are received from users (e.g., administrators) to pin particular file system subtrees to specifically identified MDSs. However, such systems rely on users to specifically identify both subtrees that need to be pinned and the MDSs to which each of the subtrees will be pinned. Accordingly, there exists a need to automatically pin subtrees in a balanced fashion across available MDSs.

One solution to this problem is to provide automated pinning policies. The automated pinning policies may automatically select subdirectories for pinning. For example, the automated pinning policies may include distributed policies, random policies and the like (discussed further below). The automated pinning policies may also automatically select MDSs to assign to manage selected subdirectories. For example, the MDSs may be selected based on a unique identifier of the selected subdirectories and may be assigned to manage metadata for the selected subdirectories (and subtrees thereof). Once automatically pinned, dynamic load balancers that manage the MDSs may be prevented from reassigning the selected subdirectories to other MDSs. Furthermore, automatically pinned subdirectories may be manually reassigned upon receiving manual pinning requests.

FIG. 1 illustrates a system 100 for automatically pinning subtrees to MDSs according to an exemplary embodiment of the present disclosure. The system 100 includes a file system tree 102 and an MDS cluster 104. The file system tree 102 may be implemented as a distributed file system spread across one or more computing devices. The file system tree 102 need not be expressly set up as a tree data structure. Rather, it may also be set up as an analogous structure, such as a folder hierarchy or other hierarchical data structure. Similarly, as discussed throughout this disclosure, any reference to a file system tree (or "tree") contemplates any hierarchical data structure and any reference to a file system subtree (or "subtree") contemplates any piece or portion of a hierarchical data structure.

The file system tree 102 may be attached to the MDS cluster 104. In particular, the MDS cluster contains multiple MDSs 106, 108, which may be assigned to monitor the metadata for one or more subtrees within the file system 102. One or more of the MDSs 106, 108 may also remain unassigned, operating in a standby mode to balance the load of the file system as necessary. The MDSs 106, 108 may be located in a single location, or may be distributed geographically. For example, the MDS 106 may be located in New York and the MDSs 108 may be located in California. Such an arrangement may be advantageous because it distributes the workload geographically and may enable MDS reassignment to reduce the distance between a client and the MDS it accesses. Alternatively, the MDSs 106, 108 may be located on one or more server racks that also include client devices that interact with the file system tree 102. This type of arrangement may be advantageous because the close proximity enables faster interactions between the MDSs 106, 108 and the client devices. The MDSs 106, 108 may be selected to minimize the distance from the client device. The MDSs may be implemented by computer hardware or by software, including virtual machines, user processes, and containers in a virtual machine system. More than one MDS 106, 108 may run on the same computer hardware in separate VMs or containers, or may run within the same operating system, virtual machine, or container as separate user processes.

The MDSs 106, 108 may also store associate information regarding operation of the MDSs. For example, the MDSs 106, 108 contain caches 116, 118, which may store information regarding the nodes managed by the MDSs, operating conditions of the MDSs, clients accessing the MDSs, and the like. As a specific example, the caches 116, 118 include node IDs 120, 122, which may store unique identifiers of the subtrees managed by the MDSs 106, 108. In particular, the node IDs 120, 122 may store a unique identifier of a node within the file system tree 102 corresponding to a base directory of the subtrees managed by the MDSs. In additional or alternative implementations, information regarding the MDSs may be stored in other systems. For example, the MDS cluster 104 may maintain an MDS assignment database storing entries identifying subtrees within the file system tree 102 and corresponding MDSs assigned to manage the subtrees. As another example, rather than being stored in a cache 116, 118 of the MDSs 106, 108, the above information may be stored as an entry within metadata corresponding to the MDSs 106, 108.

The MDS cluster 104 may be configured to assign and manage the MDSs 106, 108 that managed the file system tree 102. In particular, the MDS cluster 104 may include a dynamic load balancer 136 configured to create and submit requests to reassign MDSs 106, 108 to manage metadata for subtrees based on operating conditions for the MDSs (e.g., available computing resources, available networking resources) and subtrees within the file system tree 102 (e.g., request or access levels for directories within the file system tree 102). Additionally or alternatively, the MDS cluster 104 may receive requests from users to pin particular subtrees within the file system tree 102. Upon receiving a request from the dynamic load balancer 136, the MDS cluster 104 may be configured to determine whether a subtree identified within the request was previously pinned in response to a request received from a user. If the subtree was previously pinned, the MDS cluster 104 may ignore the request from the dynamic load balancer 136 in order to maintain the pinned management of the subtree to the requested MDS 106, 108.

As one specific example, the MDS cluster 104 includes a request 110, which may be received from a user, such as a system administrator or a file system client. The user may interact with a user interface to create the request 110, or may run one or more lines of code to create the request. For example, the user may use a GUI to indicate that a subtree should be pinned according to a particular policy or may type a line of code indicating the same in a command line. The user may also include a line of code within a separate program that causes the program to create the request 110. The request 110 includes a policy 124 and a base node 126. The base node 126 may identify a particular subtree within the file system tree 102 that is to be pinned according to the policy 124. For example, the base node 126 may correspond to a subdirectory within a file system identified by the file system tree 102. The policy 124 may identify a particular type of policy used to pin subnodes (e.g., subdirectories) of the base node 126. For example, the policy 124 may include one or more of a distributed policy, a random policy, a conditional distributed policy, a fragment policy, a filename policy, a dominant directory policy, and a dominant request policy. These policies are discussed in greater detail below, but may specify which subnodes of the base node 126 should be pinned. For example, the distributed policy may pin each of the subnodes of the base node 126. As another example, the random policy may pin a random subset of the subnodes of the base node 126. Additionally, in light of the present disclosure, further automated policies may be apparent to one skilled in the art. All such disclosures are considered within the scope of the present disclosure.

To pin a subnode or subdirectory of the file system 102 according to a policy 124, the MDS cluster 104 may select an MDS 106, 108 to be assigned to manage metadata and metadata requests for the subnode or subdirectory. In particular, the MDS cluster 104 may select an MDS to manage the subdirectory in a random or semi-random manner that can be reproduced such that the same MDS is selected for any particular subnode, but that the MDSs are evenly distributed between a plurality of subnodes to be pinned. As a specific example, the MDS cluster 104 may select the MDS 106 to manage a particular subnode (e.g., a subtree originating at the subnode) based on a unique identifier of the subnode. In particular, the MDS cluster 104 may select the MDS 106 based on an inode identifier of the subnode or subdirectory within the file system managed by the file system tree (e.g., an inode within a Linux or other Unix-like file system). To select the MDS 106, the MDS cluster 104 may hash the inode identifier. In particular, in order to reproducibly select the same MDS 106 for a particular subnode, the MDS cluster 104 may perform a consistent hash of the inode identifier to produce an indication of the MDS 106 to which the subnode is to be pinned. The selected MDS 106 may then be assigned to manage the metadata for the subnode and associated subdirectory of the file system tree 102. In particular, to pin the subnode to the selected MDS 106, a node ID (e.g., an inode identifier) of the subnode may be added to a cache 116 of the MDS 106. Additionally or alternatively, an assignment of the subnode may be added to an MDS assignment database managed by the MDS cluster 104. A previous assignment for the subnode may also be removed by the MDS cluster 104. For example, a node ID for the subnode may be removed from a cache of the MDS previously assigned to manage metadata for the subnode or subdirectory. Additionally or alternatively, an assignment of a previous MDS to manage the subnode may be deleted or otherwise invalidated from an MDS assignment database or journal file managed by the MDS cluster 104.

The MDS cluster 104 may also be configured to receive and process other types of requests 112, 114. For example, the request 112 may be received to add or update metadata associated with a particular node or subdirectory within the file system tree. For example, the request 112 includes a node ID 128 and metadata 130. The node 128 may identify the node within the file system tree 102 and corresponding directory within the file system for which metadata is requested or is to be updated. The metadata 130 may specify a type of metadata that is requested. For example, the metadata 130 may indicate that permissions information is requested for the node identified by the node ID 128 (e.g., users and associated read, write, execute permissions). Additionally or alternatively, the metadata 130 may specify types of metadata to be updated for a node (or directory) associated with the node ID 128. For example, the metadata 130 may include additional or updated permissions for a particular user to be added or replaced for the node associated with the node ID 128.

As another example, the request 114 may be received to add a directory to the file system tree 102. The request 114 includes a node ID 132 and a directory 134. The request 114 may be received to add the directory 134 to a node (or subnode) identified by the node ID 132. For example, the directory 134 may include metadata regarding the directory to be created (e.g., directory name, permissions) and/or may include or otherwise specify data to be stored within the directory to be created. Upon receiving the request 114, the MDS cluster 104 may create the directory within the node corresponding to the node ID 132 and may update certain types of metadata associated with the created directory and other associated directories (e.g., subdirectories of the directory 134, parent directories of the directory 134). In addition, the MDS cluster 104 may also apply any automated pinning policies (e.g., random policies, distributed policies, and the like) associated with any parent node(s) of the new directory 134. In particular, in instances where more than one parent node has an associated automated pinning policy, the MDS cluster 104 may apply the automated pinning policy associated with the closest parent node (e.g., the parent node with the fewest intervening links) within the file system tree 102.

One or both of the file system tree 102 and the MDS cluster 104 may be implemented by one or more computing devices. For example, although not depicted, the MDS cluster 104 and/or the file system tree 102 may include a memory and a processor (e.g., a virtual memory, a physical memory, a virtual processor, a physical processor) configured to implement at least one operational feature of the MDS cluster 104 and/or the file system tree 102. For example, the memory may contain instructions which, when executed by the processor, cause the processor to implement at least one operational feature of the MDS cluster 104 and/or the file system tree 102.

Additionally, the file system tree 102 and the MDS cluster 104 (and any computing devices implementing the file system tree 102 and the MDS cluster 104) may be configured to communicate using a network. For example, the file system tree 102 and the MDS cluster 104 may communicate with the network using one or more wired network interfaces (Ethernet interfaces) and/or wireless network interfaces (e.g., W-Fi®, Bluetooth®, and/or cellular data interfaces). In certain instances, the network may be implemented as a local network (e.g., a local area network), a virtual private network, and/or a global network (e.g., the Internet).

Figure 2:
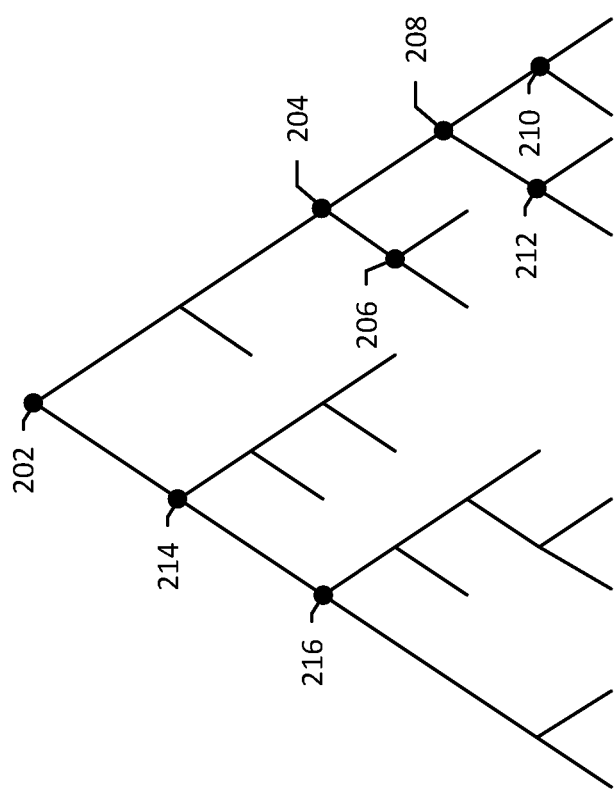
FIG. 2 illustrates an example file system tree according to an exemplary embodiment of the present disclosure.

FIG. 2 depicts an example file system tree 202 according to an example embodiment of the present disclosure. Trees and subtrees within this disclosure will be denoted by the highest node of the tree included in the tree or subtree. For example, the file system tree 202 includes all of the nodes within the tree. As another example, the subtree 204 includes the nodes 206, 208, 210, and 212. The subtrees can be contained within other subtrees. For example the subtree 216 is contained within the subtree 214 and the subtrees 206 and 208 are contained within the subtree 204.

Although file system tree 202 only includes a maximum of 2 child nodes per parent node, this is only intended for clarity of illustration. File system trees and other hierarchical databases including more than 2 children per parent are contemplated. Also, as used throughout this disclosure, the terms "parent" and "parent subtree" may refer to any subtree defined by a node located above the child subtree, and need not be the subtree defined by the node directly above the child subtree. For example, the subtree 204 is a parent of the subtree 212 even though the subtree 208 is also a parent of the subtree 212. In certain examples, the terms "grandparent" and "grandparent subtree" may be used to simplify the discussion. For example, the subtree 208 may be referred to as a parent of the subtree 212 and the subtree 204 may be referred to as a grandchild of the subtree 212. Similarly, the terms "child" or "child subtree" need not refer to the subtree defined by the node immediately below a parent. For example, the subtree 212 is a child of the subtree 204. Further, the terms "grandchild" and "grandchild subtree" may be used to simplify the discussion. For example, the subtree 212 is a child of the subtree 208 and a grandchild of the subtree 204.

Individual nodes in the file system tree 202 may be identified using related terminology. For example, an individual "node" may refer to a particular directory and the contents thereof (e.g., files stored, associated metadata). Referring to a node may refer to subdirectories of the particular directory (e.g., a subtree originating at the node). Additionally or alternatively, referring to a node may be exclusive of other subdirectories contained within the particular directory. Accordingly, a "parent node" may refer to any particular node above a given node within the file system tree 202. For example, the node 208 is a parent node for the node 212 and the node 204 is a parent node for the node 212. Additionally, a "child node" may refer to any particular node below a given node within the file system tree 202. For example, the node and the node 210 is a child node of the node 204.

The file system tree 102 may be implemented by the file system tree 202. For example, a request may be received to pin subdirectories of the node 208 according to a distributed policy. The MDS cluster 104 may then select the MDS 106 to manage the subtree 212 and may select the MDS 108 to manage the subtree 210. A dynamic load balancing system of the MDS cluster 104 may then generate a request to assign a further MDS (not depicted) to manage the subtree 204. After processing this request, a dynamic load balancer 136 of the MDS cluster 104 may assign the further MDS to manage the subtree 204 and the subtree 206, but may leave the subtree 208 and associated subnodes 210, 212 assigned to their respective MDSs 106, 108. In certain instances, such a request may also reassign the subnode 208 to the further MDS while leaving the subnodes 210, 212 assigned to their respective MDSs 106, 108.

Figure 3:
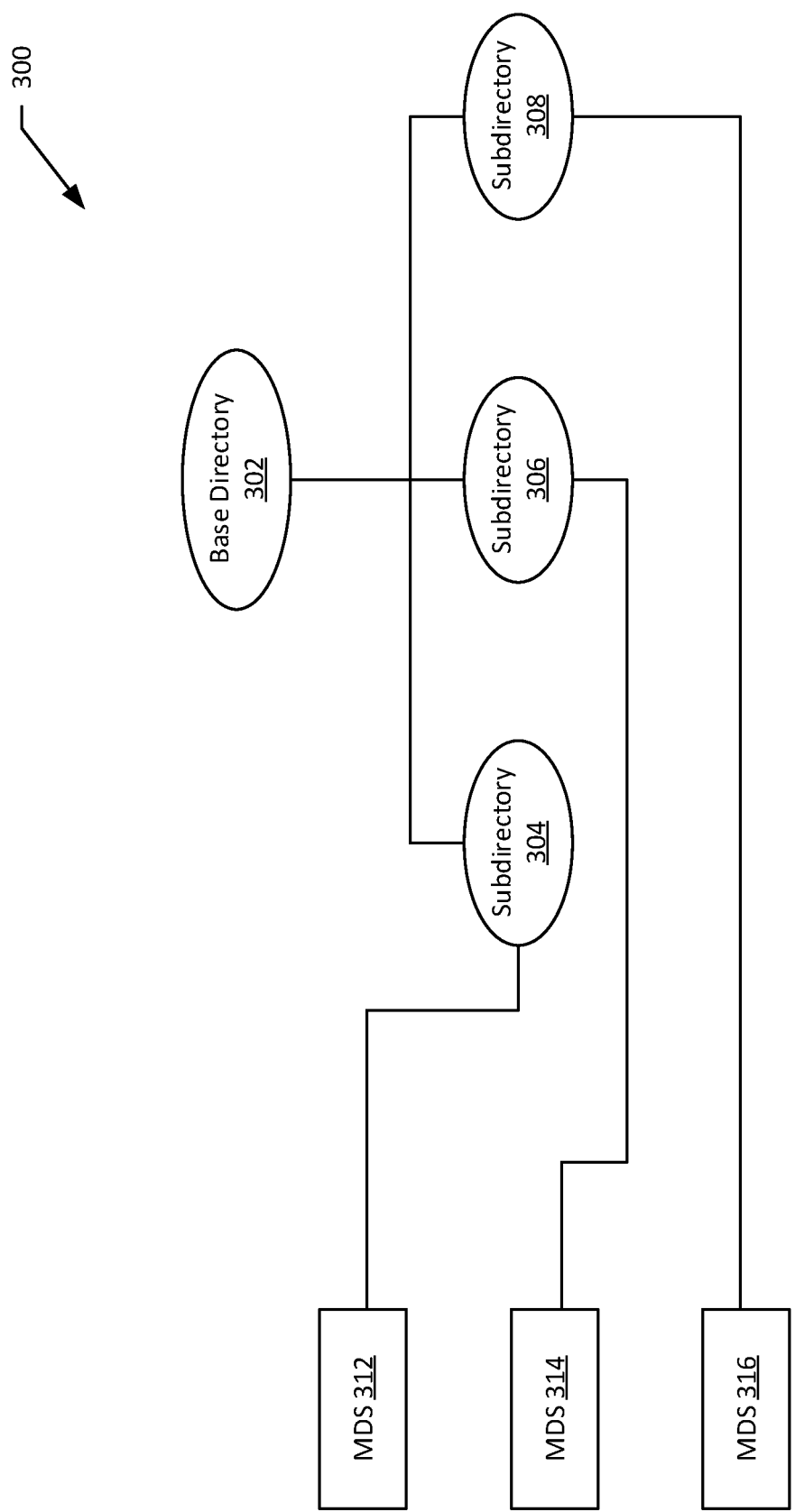
FIG. 3 illustrates an application of a distributed policy for pinning subtrees according to an exemplary embodiment of the present disclosure.

FIG. 3 illustrates an application 300 of a distributed policy for pinning subtrees according to an exemplary embodiment of the present disclosure. The application 300 includes a base directory 302, subdirectories 304, 306, 308, and MDSs 312, 314, 316 available to manage metadata. The application 300 may be performed by an MDS cluster, such as the MDS cluster 104. For example, the MDS cluster may receive a request identifying a distributed policy and identifying the directory 302 as the base directory for the distributed policy.

A distributed policy may be configured to automatically pin the immediate child subdirectories of the base directory 302. Accordingly, in the application 300, the distributed policy may be implemented such that the immediate child subdirectories 304, 306, 308 are pinned to the MDSs 312, 314, 316. In particular, an MDS 312, 314, 316 may be identified for each of the subdirectories 304, 306, 308 based on a unique identifier of the subdirectories 304, 306, 308. As a specific example, and as discussed further herein, in MDS 312, 314, 316 for each of the subdirectories 304, 306, 308 may be identified based on an inode identifier for the subdirectories 304, 306, 308 (e.g., based on a consistent hash of the inode identifier).

As can be seen in the application 300, selecting MDSs 312, 314, 316 for subdirectories 304, 306, 308 in this manner allows for the subdirectories 304, 306, 308 to be evenly distributed amongst the available MDSs 312, 314, 316. Furthermore, by using automated policies such as the distributed policy, and MDS cluster may be able to maintain consistent pinning practices, even as the subdirectories within the base directory 302 change. For example, if a new subdirectory is added to the base directory 302, the MDS policy 104 may be configured to additionally pin the newly-created subdirectory to an available MDS (which may or may not be depicted) based on a unique identifier of the newly-created subnode.

In certain implementations of the distributed policy, further child subdirectories of the subdirectories 304, 306, 308 (e.g., grandchild subdirectories of the base directory 302) may not be pinned. However, in additional or alternative implementations, the distributed policy may pin further levels of subdirectories. For example, the request received identifying the distributed policy in the base node 302 may also specify a level of depth (e.g., one level, two levels, three levels) for which subdirectories of the base directory 302 will be pinned. In additional or alternative implementations, entire subtrees corresponding to the subdirectories 304, 306, 308 may be pinned. For example, the subdirectory 304 and all directories beneath the subdirectory 304 within a file system tree may be assigned to the MDS 312 for management. Similarly, the subdirectories 306, 308 and all directories beneath the subdirectories may be assigned to the MDSs 314, 316 for management.

Figure 4:
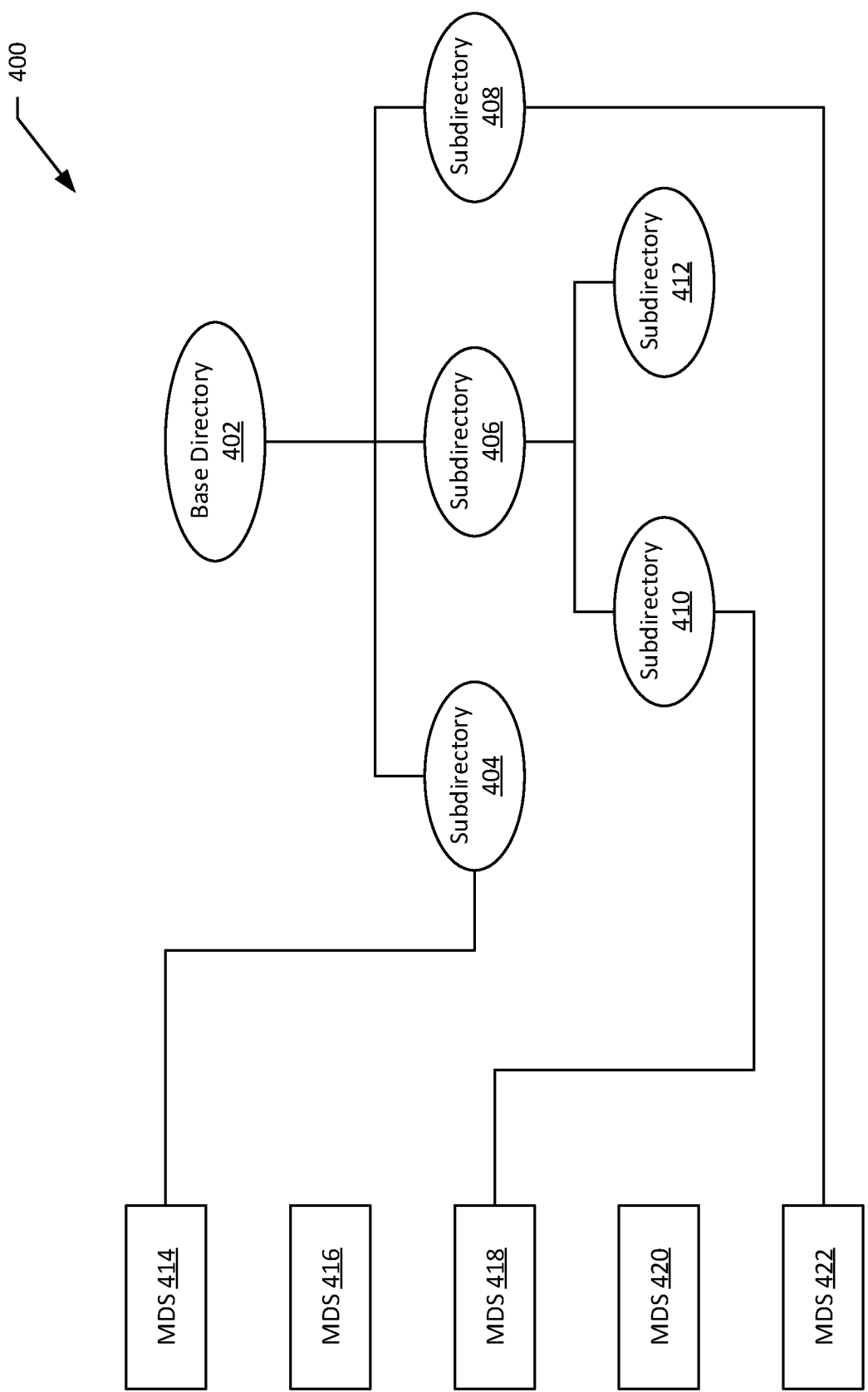
FIG. 4 illustrates an application of a random policy for pinning subtrees according to an exemplary embodiment of the present disclosure.

FIG. 4 illustrates an application 400 of a random policy for pinning subtrees according to an exemplary embodiment of the present disclosure. The application 400 includes a base directory 402, subdirectories 404, 406, 408 of the base directory 402, and subdirectories 410, 412 of the subdirectory 406. The application 400 also includes MDSs 414, 416, 418, 420, 422 available to manage metadata. The application 400 may be performed by an MDS cluster, such as the MDS cluster 104. For example, the MDS cluster may receive a request identifying a random policy and identifying the directory 402 as the base directory for the random policy.

A random policy may be configured to automatically pin a random subset of the subdirectories of the base directory 402. For example, a request to implement a random policy may specify a proportion within a range (e.g., from 0 to 1, from 0% to 100%) of the subdirectories for the base directory 402 that should be pinned. For each subdirectory 404, 406, 408 of the base directory 402, the MDS cluster may randomly decide whether to pin the subdirectory based on the proportion specified in the request. For example, the MDS cluster may randomly generate a number within the same range as the proportion (e.g., from 0 to 1, from 0% to 100%) for each subdirectory 404, 406, 408 and may pin the subdirectory if the random number is less than or equal to the proportion specified in the request. Similarly, the MDS cluster may not pin the subdirectory if the random number is greater than the portion specified in the request. This example should be understood as exemplary, and other techniques for randomly selecting a subset of the subdirectories 404, 406, 408 based on a specified proportion may be used, as understood by one skilled in the art in light of the present disclosure. All such implementations are hereby considered within the scope of the present disclosure.

This process may be repeated for additional subdirectories within the file system. In particular, the process may be repeated for grandchild subdirectories 410, 412 of the base directory 402 to randomly select a subset of the grandchild subdirectories 410, 412 for pinning. It should be understood that this process may be subsequently repeated for any number of levels of subdirectories beneath the base directory 402. In certain implementations, this process may be repeated for all subdirectories and children thereof for the base directory 402. In additional or alternative implementations, a request to implement a random policy may specify a depth (e.g., two levels, three levels, five levels) of subdirectories to be analyzed for potential pinning.

A random subset of subdirectories 404, 408, 410 may accordingly be selected for pinning. The selected subdirectories 404, 408, 410 may be pinned to particular MDSs 414, 418, 422 based on a unique identifier of the subdirectories 404, 408, 410. In particular, as discussed further herein, an MDS may be selected for each of the selected subdirectories 404, 408, 410 based on an inode identifier of the subdirectories 404, 408, 410 (e.g., based on a consistent hash of the inode).

Random policies may be used to evenly distribute subdirectories 404, 406, 408 (and child subdirectories 410, 412) of a base directory 402 between available MDSs 414, 416, 418, 420, 422. In particular, by randomly selecting and pinning a subtree of the base directory 402, the random policy may assist with distributing a load across MDSs 414, 416, 418, 420, 422 without excessive metadata migration and MDS reassignment. Furthermore, the random policy may be configured to keep consistent the proportion of subdirectories that are pinned to particular MDSs. For example, the above-described process for randomly determining whether a subdirectory is pinned based on the proportion associated with the random policy may be repeated for newly-created subdirectories within a subtree of the base directory 402, and the newly-created subdirectories may be pinned based on the results of the process.

Different policies may provide different advantages. For example, the distributed policy may be beneficial for distributing assignments of subdirectories of the base directory without fracturing the subtrees of the pinned subdirectories. One particular use case for a distributed policy is to automatically pin subtrees for separate users' home directories (e.g., within a "/home" directory containing the users separate home directories). As another example, random policies may be beneficial for randomly dividing and distributing subtrees beneath a base directory within a file system tree. One use case may be where the base directory is expected to receive a lot of queries and would thereby benefit from being divided between multiple MDSs.

It should also be understood that different types of policies may also be used. For example, conditional distributed policies may be used in addition to or alternatively to distributed policies. Such policies may not automatically pin subdirectories of the base directory until a particular condition is met. For example, the condition could include exceeding a predetermined number of subdirectories for the base directory, receiving more than a predetermined number of requests, using more than a predetermined amount of computing resources, having a height or depth below the base directory that exceeds a predetermined threshold, and the like. As another example, the policy could include a fragment policy, where subdirectories that are fragmented (e.g., that have been divided into multiple parts for management by multiple MDSs) have their fragments pinned. As a further example, a filename policy may be used that automatically pins subdirectories of a specified base directory with a file name or file naming pattern that matches a specified template file name or pattern. As yet another example, the policy may include a dominant directory policy, where a subdirectory of a specified base directory is automatically pinned if, over a certain period of time, the subdirectory and its associated subtree receives the most requests and/or uses the most computing resources in processing received requests. In other instances, the policy may include a dominant request policy. Requests for metadata may include different types of requests (e.g., stat requests, create requests, unlink requests). The dominant request policy may specify a type of request (e.g., stat requests) and may pin all subdirectories of the base directory that predominantly receive the specified type of request (e.g., as a majority of the received requests, as a plurality of received requests). For any of the above policies, similar techniques to those discussed above may be used to identify the MDSs to which selected subdirectories are pinned for metadata management.

Figure 5:
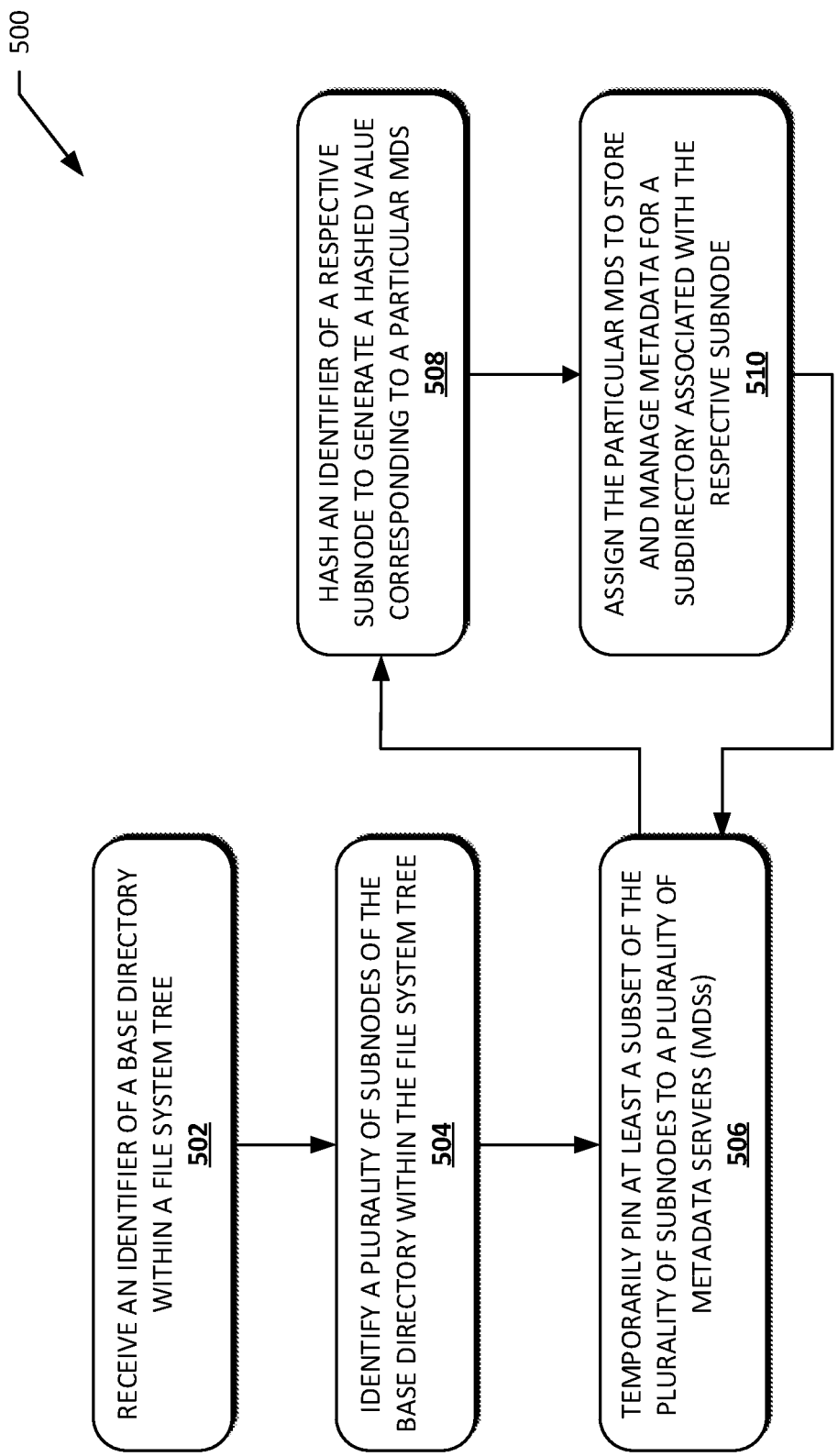
FIG. 5 illustrates a method for automatically pinning subtrees according to an exemplary embodiment of the present disclosure.

FIG. 5 illustrates a method 500 for automatically pinning subtrees according to an exemplary embodiment of the present disclosure. In particular, the method 500 may be performed to automatically pin subtrees according to a distributed policy. The method 500 may be implemented on a computer system, such as the system 100. For example, the method 500 may be implemented by the MDS cluster 104 and/or the file system tree 102. The method 500 may also be implemented by a set of instructions stored on a computer-readable medium that, when executed by a processor, cause the computer system to perform the method 500. For example, all or part of the method 500 may be implemented by a processor and/or a memory of the MDS cluster 104. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with receiving an identifier of a base directory within a file system tree (block 502). For example, the MDS cluster 104 may receive an identifier of a base directory within a file system tree 102 (e.g., the base directory 302). In certain instances, the identifier of the base directory may be received within a request 110 to implement a distributed policy. For example, the base directory 302 may be identified by a base node 126 within the request 110 (e.g., an identifier of a base node 126 within the file system tree 102 that corresponds to the base directory 302). In additional or alternative implementations, a request to implement the policy may be received as an attribute or other metadata of the base directory 302 (e.g., a POSIX-extended attribute, or "xattr," of the base directory 302). For example, the base directory 302 may include a "policy" or "distributed policy" attribute (or similar) that may be updated to indicate a distributed policy has been applied to the base directory 302. For example, the distributed policy attribute may be a binary attribute indicating whether a distributed policy has been assigned to the base directory 302. In such instances, the request to apply the distributed policy may be received by setting the distributed policy to indicate that the policy is being applied. In additional or alternative implementations, the distributed policy attribute may be a numerical (e.g., integer) value indicating the number of levels beneath the base directory 302 to which the distributed policy should apply. In such instances, where the distributed policy attribute is zero, it may be determined that no distributed policy applies to the base directory 302 and, if the distributed policy attribute is greater than zero, it may be determined that a distributed policy applies to the base directory 302.

A plurality of subnodes of the base directory within the file system tree may be identified (block 504). For example, the MDS cluster 104 may identify a plurality of subnodes corresponding to subdirectories 304, 306, 308 of the base directory 302 within the file system tree 102. In particular, the MDS cluster 104 may identify subnodes for the direct children of the base directory (e.g., subnodes with a depth of 1). For example, the MDS cluster 104 may identify subnodes corresponding to each direct child subdirectory 304, 306, 308 of the base directory 302. In additional or alternative implementations, the MDS cluster 104 may identify further subnodes corresponding to children of the child subdirectories 304, 306, 308 (e.g., grandchildren subdirectories of the base directory 302 with a depth greater than 1) and/or additional, lower-level child subdirectories of the base directory 302. As explained above, a request 110 to implement a distributed policy and/or a distributed policy attribute used to indicate that a distributed policy has been applied to the base directory 302 may specify a number of levels below the base directory 302 (e.g. a depth below the base directory 302, such as 2 levels, 5 levels 10 levels, or more) to be included within the distributed policy. The MDS cluster may identify all such child subnodes within the file system tree down to the level specified within the request and/or distributed policy attribute.

At least a subset of the plurality of subnodes may be temporarily pinned to a plurality of metadata servers (block 506). For example, the MDS cluster 104 may pin at least a subset of the subnodes identified at block 504 to a plurality of MDSs 106, 108, 312, 314, 316 managed by the MDS cluster 104. In certain implementations, the MDS cluster 104 may pin all of the subnodes corresponding to all of the subdirectories identified at block 504. In additional or alternative implementations, the MDS cluster 104 may only pin a subset of the subnodes. For example, the distributed policy may include a proportion measure indicating that only a subset of (e.g., the proportion of) the identified subnodes should be pinned. As another example, the MDS cluster 104 may determine that one or more of the identified subnodes have already been manually pinned by a request received directly from a user (e.g., a request specifying both (i) the subnode or a subtree containing the subnode and (ii) an identifier of a particular MDS to which the subnode or the subtree is to be pinned). As a specific example, the MDS cluster 104 may determine that a subnode or a subtree containing the subnode was pinned according to the techniques discussed in U.S. application Ser. No. 15/867,176, entitled "DYNAMIC SUBTREE PINNING IN STORAGE SYSTEMS" and filed on Jan. 10, 2018, which is incorporated by reference. In such instances, manual pinning requests for subnodes or subtrees of the base directory 302 may override requests according to automated policies such as the distributed policy and any such manually pinned subnodes may be excluded from being pinned at block 506.

To pin each respective subnode of the at least a subset of the subnodes, an identifier of the respective subnode may be hashed to generate a hash value corresponding to a particular MDS (block 508). For example, the MDS cluster 104 may hash a unique identifier of the respective subnode (e.g., a respective subnode corresponding to a subdirectory 304, 306, 308). In particular, the MDS cluster 104 may hash an inode identifier of the subnode or a subdirectory associated with the subnode. For example, the inode identifier may be hashed according to a consistent hashing strategy to generate a hash value that corresponds to a particular MDS 106, 108, 312, 314, 316. In particular, the inode identifier may be consistently hashed with a numeric identifier of the number of MDSs within the MDS cluster 104. Additionally or alternatively, the inode identifier may be consistently hashed with a numeric identifier of the number of MDSs available to receive a pinned subdirectory (e.g., MDSs with computing resources below a predetermined threshold, a number of assigned subnodes or subtrees below a predetermined threshold, and/or a number/rate of received metadata requests 112 below a predetermined threshold). The consistent hashing may produce a hash value that corresponds to (e.g., that maps to) one of the available MDSs. As a specific example, and referring to the application 300, an inode identifier of a subnode associated with the subdirectory 304 may be consistently hashed with the number of available MDSs 312, 314, 316 (e.g., 3), which may produce a hash value corresponding to the MDS 312. For example, the consistent hashing process may produce a range of values, subsets of which may be assigned to each of the available MDSs 312, 314, 316. The particular hash value produced based on the inode identifier and the number of available MDSs 312, 314, 316 may then be mapped to the MDS 312 based on a mapping (e.g., a mapping stored within a database of the MDS cluster and/or a mapping implemented by the consistent hashing process based on the number of available MDSs).

The particular MDS may be assigned to store and manage metadata for a subdirectory associated with the respective subnode (block 510). For example, the MDS cluster 104 may assign the particular MDS identified a block 508 to store and manage metadata for a corresponding subdirectory of the respective subnode within the file system tree 102. Assigning the particular MDS may also include assigning the MDS to manage metadata for the subtree of the file system tree 102 at the respective subnode. The particular MDS may be assigned by adding an identifier (e.g., an inode identifier) of the respective subnode to a cache 116, 118 of the particular MDS. For example, the identifier of the respective subnode may be provided to the particular MDS, which may update a journal of the particular MDS to include the identifier of the subnode and may update a journal file stored in the cache 116, 118 to include the identifier of the respective subnode. Continuing the previous example, an inode identifier of the subnode corresponding to subdirectory 304 may be provided to the MDS 312. The MDS 312 may update a journal file contained within the MDS 312 to include the inode identifier of the subnode.

In certain instances, the respective subnode may be "ephemerally pinned" to the particular MDS. Such subnodes may be considered pinned, because the assignments at block 510 may override attempts by automated reassignment services (e.g., dynamic load balancers 136 of the MDS cluster). However, ephemerally pinned directories may also be considered temporarily pinned because the assignment of the subdirectory corresponding to the respective subnode may not persist after receiving a specific request to manually pin the respective subnode or a parent subnode to a different MDS. For example, a request may be received that (i) specifically identifies the respective subnode or a parent node and (ii) individually identifies a different MDS for assignment. In such instances, the request may override the ephemeral pinning to the particular MDS at block 510. The assignment of the subnode may also not persist if the identifier is flushed or otherwise removed from the cache 116, 118. For example, the particular MDS may be configured to begin removing assigned subnodes and subdirectories upon encountering a particular resource constraint (e.g., processor utilization above a predetermined threshold, available memory below a predetermined threshold). The particular MDS may remove assigned subnodes and subdirectories by deleting identifiers of the subnodes in the subdirectories from the cache 116, 118 and/or journal stored within the particular MDS. Subnodes and subdirectories may be removed based on one or more of an order of assignment (e.g., first in first out, last in first out), a time since a request 112 for metadata 130 was last received, and/or computing resources utilized in responding to requests 112 for metadata. However, in certain implementations, the MDSs may be configured to avoid removing assignments for ephemerally pinned subnodes and subdirectories during an MDS failover, in which subnodes and subdirectories are reassigned to improve overall MDS availability. As a specific example, the respective subnode of the subdirectory 304 may be ephemerally pinned to the MDS 312 such that the MDS cluster 104 disregards requests from the dynamic load balancer 136 to reassign the respective subnode to another MDS 314, 316. Furthermore, requests to pin or reassign parent nodes of the respective subnode (e.g., nodes corresponding to a parent directory of the base directory 302) may not be applied to the respective subnode. On the other hand, if a request is received to manually pin the respective subnode or a parent node to the MDS 314, the respective subnode may be assigned to the MDS 314. As a further example, if metadata requests are not received for the subdirectory 304 for a predetermined period of time (e.g., 5 minutes, 5 hours, 12 hours, 1 day) or if computing resource utilization for the MDS 312 exceeds a predetermined threshold, the MDS 312 may remove an identifier of the respective subnode from the cache of the MDS 312 and may accordingly remove the assignment of the subdirectory 304, allowing the respective subnode to be reassigned by the dynamic load balancer 136.

Blocks 508, 510 may be repeated for each of the subnodes to be pinned (e.g., all of the subnodes identified at block 504, a subset of the subnodes identified at block 504). In this way, each of the desired subnodes and corresponding subdirectories may be assigned according to the distributed policy. Furthermore, depending on the type of distributed policy, all or part of the method 500 may be repeated. As a specific example, blocks 506-510 may be repeated for directories added to the base directory 302 in order to pin the added directories according to the distributed policy.

Figure 6:
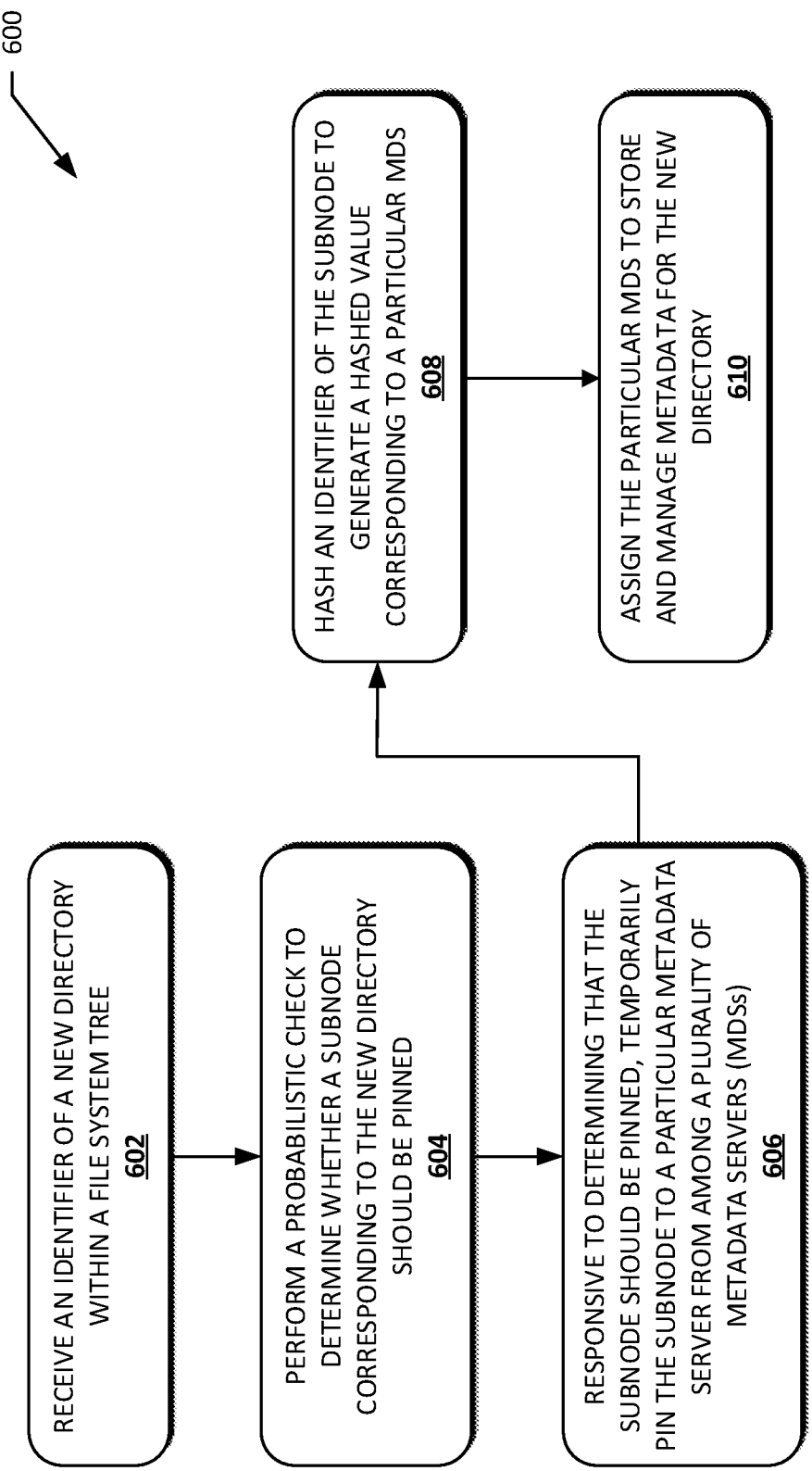
FIG. 6 illustrates a method for automatically pinning subtrees according to an exemplary embodiment of the present disclosure.

FIG. 6 illustrates a method 600 for automatically pinning subtrees according to an exemplary embodiment of the present disclosure. In particular, the method 600 may be performed to automatically pin subtrees according to a random policy. The method 600 may be implemented on a computer system, such as the system 100. For example, the method 600 may be implemented by the MDS cluster 104 and/or the file system tree 102. The method 600 may also be implemented by a set of instructions stored on a computer-readable medium that, when executed by a processor, cause the computer system to perform the method 600. For example, all or part of the method 600 may be implemented by a processor and/or a memory of the MDS cluster 104. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving an identifier of a new directory within a file system tree (block 602). For example, the MDS cluster 104 may receive an identifier of a new directory within a file system tree 102. The new directory may include a newly-created directory within a subtree of a base directory 402 associated with a random policy. Additionally or alternatively, the new directory may include a directory that is not included within the cache 116, 118 of an MDS 106, 108 within the MDS cluster 104. For example, the new directory may include a directory for which a request 112 for metadata 130 has not been received in a long enough period of time that the directory and associated subnode of the file system tree 102 have been removed from the caches 116, 118 of any assigned MDSs 106, 108. As another example, the new directory may include a directory within the file system tree 102 that has not been manually pinned, automatically pinned, or dynamically assigned to an MDS 106, 108 of the MDS cluster 104.

A probabilistic check may then be performed to determine whether a subnode corresponding to the new directory should be pinned (block 604). For example, the MDS cluster 104 may perform a probabilistic check to determine whether a subnode corresponding to the new directory should be pinned. The probabilistic check may be performed based on a proportion associated with the random policy. For example, the proportion may be identified in a request to implement the random policy and/or in an attribute or other metadata of the base directory 402. For example, the random policy may be indicated as a "policy" or "random policy" attribute of the base directory 402. As a specific example, the random policy may be indicated as a "random policy" attribute specifying a number of levels beneath the base directory 402 to which the distributed policy should apply (similar to the "distribute policy attribute" discussed above in connection with block 502) and/or a proportion for the random policy (e.g., a proportion of the subdirectories of the base directory 402 that are to be pinned).

To perform the probabilistic check, the MDS cluster 104 may generate a random number (e.g., from 0 to 1, from 0% to 100%) based on a range of valid values for the proportion of the random policy. Based on the random number, the MDS cluster 104 may determine whether a subnode associated with the new directory should be pinned. For example, if the random number is less than or equal to the proportion for the random policy, the MDS cluster 104 may determine that the subnode should be pinned. As another example, if the random number is greater than the proportion for the random policy, the MDS cluster may determine that the subnode should not be pinned. Responsive to determining that the subnode should not be pinned, the method 600 may terminate (not depicted in FIG. 6).

On the other hand, responsive to determining that the subnode should be pinned, the subnode should be temporarily pinned to a particular metadata server from among a plurality of metadata servers (block 606). For example, the subnode may be pinned by hashing an identifier of the subnode to generate a hashed value corresponding to a particular MDS (block 608) and assigning the particular MDS to store and manage metadata for the new directory (block 610). Blocks 606-610 may be implemented similar to blocks 506-510.

In certain implementations, the method 600 may be repeated at least in part. For example, multiple new directories may be added to or accessed from a subtree of the file system tree 102 associated with a random policy. In such instances, the MDS cluster 104 may receive identifiers for multiple new directories at block 602. In response, the method 600 may be repeated for each of the received identifiers. Similarly, the method 600 or similar may be repeated for subdirectories of a base directory 402 after a random policy is assigned to the base directory 402. For example, the method 600 may be performed for each subdirectory within a subtree (e.g., a complete subtree, a subtree of a particular, specified depth) of the base directory 402.

In this way, the methods 500, 600 enable MDS clusters 104 to automatically pin subnodes associated with subdirectories to particular MDSs within the MDS clusters 104 according to pre-specified policies. Such policies may help to ensure that workloads for identified base directories are evenly distributed across available MDSs within the MDS cluster 104. Evenly distributing workloads and pinned subdirectories in this way may improve the reliability of MDSs (e.g., may improve response time, server uptime, computing hardware availability). Furthermore, because the methods 500, 600 may be repeated at least in part for newly-added or newly-accessed directories associated with a particular policy (e.g., a distributed policy, a random policy, etc.), the methods 500, 600 may ensure that all subdirectories associated with a particular policy are pinned (or not pinned) in compliance with the policy.

Furthermore, the methods 500, 600 may be repeated when a number of MDSs within the MDS cluster 104 changes. For example, the methods 500, 600 may be repeated for each subnode and subdirectory that was pinned according to the distributed policy or random policy. In such instances using a consistent hashing process to select a particular MDS at blocks 508, 608 may reduce the overall number of subnodes and subdirectories that have to be repinned due to a change in the number of available MDSs. In particular, using a consistent hashing process may ensure that no more than $1/N*100\%$ of the previously-pinned subnodes and subdirectories need to be reassigned, when N is the number available MDSs in the MDS cluster after MDSs are added or removed. Accordingly, for sufficiently large numbers of MDSs (e.g., five or more MDSs, 10 or more MDSs, 50 or more MDSs), the techniques utilized by the methods 500, 600 to automatically identify MDSs for pinning subnodes may dramatically reduce the number of re-pinned subnodes and subdirectories, thereby reducing the overall computing resources necessary to apply and maintain the automated pinning policies.

It should also be appreciated that, in additional or alternative implementations, techniques similar to those discussed above in connection with the methods 500, 600 may be used to automatically pin subnodes and subdirectories according to policies other than distributed policies and random policies. For example, similar techniques may be used to apply a conditional distributed policy, a fragment policy, a filename policy, a dominant directory policy, and/or a dominant request policy. In such instances, certain blocks (e.g., blocks 502, 504, 602, 604) may differ from the methods 500, 600. For example, as explained previously, different techniques may be used to identify when subdirectories need to be pinned and/or which subdirectories need to be pinned according to any of the previously-discussed policies. In such instances these techniques may be used instead of those discussed in connection with blocks 502, 504, 602, 604. However, in certain such implementations, techniques similar to those of blocks 506-510, 606-610 may be performed and/or repeated to pin the selected subdirectories.

Figure 7:
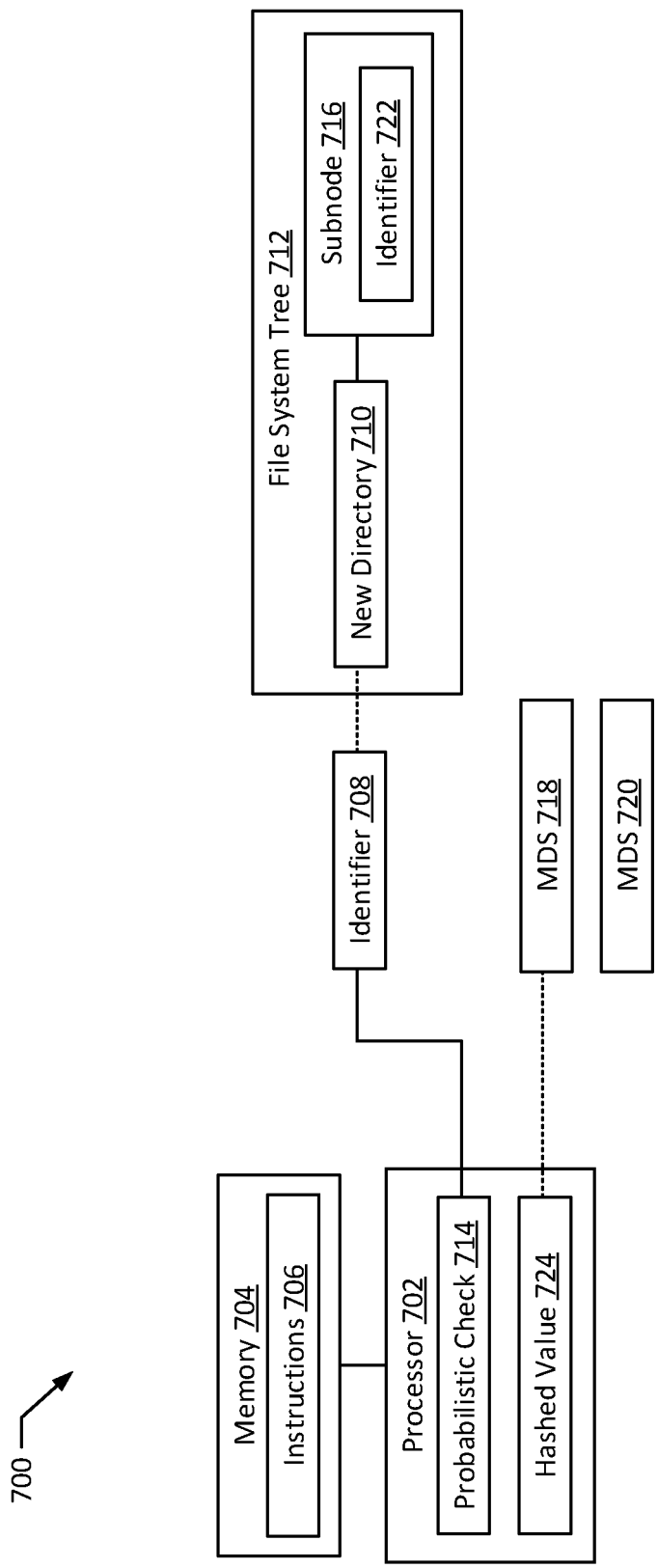
FIG. 7 illustrates a block diagram of a system according to an exemplary embodiment of the present disclosure.

FIG. 7 illustrates a block diagram of a system 700 according to an exemplary embodiment of the present disclosure. The system 700 includes a processor 702 and a memory 704. The memory 704 stores instructions 706 which, when executed by the processor 702, cause the processor 702 to receive an identifier 708 of a new directory 710 within a file system tree 712 and perform a probabilistic check 714 to determine whether a subnode 716 corresponding to the new directory 710 should be pinned. Responsive to determining that the subnode 716 should be pinned, the subnode 716 is temporarily pinned to a particular metadata server 718 from among a plurality of metadata servers 718, 720. Temporarily pinning the subnode 716 may include hashing an identifier 722 of the subnode 716 to generate a hashed value 724 corresponding to the particular MDS 718 and assigning the particular MDS 718 to store and manage metadata 726 for the new directory 710.

Aspects of the subject matter described herein may be useful alone or in combination with one or more aspects described herein. In a first aspect, a method is provided that includes receiving an identifier of a base directory within a file system tree and identifying a plurality of subnodes of the base directory within the file system tree. The method may also include temporarily pinning at least a subset of the subnodes to a plurality of metadata servers (MDSs) by, for each respective subnode of the at least a subset of the subnodes, hashing an identifier of the respective subnode to generate a hashed value corresponding to a particular MDS and assigning the particular MDS to store and manage metadata for a subdirectory associated with the respective subnode.

In a second aspect according to any of the previous aspects (e.g., the first aspect) the particular MDS is temporarily assigned to manage metadata for the subdirectory.

In a third aspect according to any of the previous aspects (e.g., the second aspect), the particular MDS ceases to be assigned to store and manage metadata for the subdirectory based on one or more of a time constraint and a resource constraint.

In a fourth aspect according to any of the previous aspects (e.g., the third aspect), the resource constraint includes (i) removing the assignment of the particular MDS when an amount of available memory for the MDS falls below a predetermined threshold and (ii) removing the assignment of the particular MDS when a cache of the particular MDS is cleared.

In a fifth aspect according to any of the previous aspects (e.g., the third aspect), the time constraint includes at least one of (i) a predetermined amount of time passing after assigning the particular MDS to store and manage metadata for the subdirectory and (ii) a predetermined amount of time passing after receiving a request for metadata associated with the subdirectory.

In a sixth aspect according to any of the previous aspects (e.g., the first aspect), the particular MDS ceases to be assigned to store and manage metadata for the subdirectory after receiving a request that identifies (i) the respective subnode and (ii) a different MDS from among the plurality of MDSs.

In a seventh aspect according to any of the previous aspects (e.g., the first aspect), the hashing is a consistent hashing operation performed based on a quantity of the plurality of MDSs.

In an eighth aspect according to any of the previous aspects (e.g., the seventh aspect), the identifier of the respective subnode is a numerical identifier of the respective subnode within the file system tree.

In a ninth aspect according to any of the previous aspects (e.g., the eighth aspect), the numerical identifier is an inode identifier of the respective subnode within the file system tree.

In a tenth aspect according to any of the previous aspects (e.g., the first aspect), assigning the particular MDS to store and manage metadata for the subdirectory includes updating directory metadata associated with the subdirectory.

In an eleventh aspect according to any of the previous aspects (e.g., the first aspect, the method further includes receiving a request identifying a distributed policy.

In a twelfth aspect according to any of the previous aspects (e.g., the eleventh aspect), the request includes the identifier of the base directory.

In a thirteenth aspect according to any of the previous aspects (e.g., the first aspect), the plurality of MDSs are implemented as part of a metadata cluster assigned to manage metadata for the file system tree.

In a fourteenth aspect, a system is provided that includes a processor and a memory. The memory may store instructions which, when executed by the processor, cause the processor to receive an identifier of a base directory within a file system tree and identify a plurality of subnodes of the base directory within the file system tree. The instructions may further cause the processor to temporarily pin at least a subset of the subnodes to a plurality of metadata servers (MDSs) by, for each respective subnode of the at least a subset of the subnode, hashing an identifier of the respective subnode to generate a hashed value corresponding to a particular MDS and assigning the particular MDS to store and manage metadata for a subdirectory associated with the respective subnode.

In a fifteenth aspect according to any of the previous aspects (e.g., the fourteenth aspect), the particular MDS is temporarily assigned to manage metadata for the subdirectory.

In a sixteenth aspect according to any of the previous aspects (e.g., the fifteenth aspect), the particular MDS ceases to be assigned to store and manage metadata for the subdirectory based on one or more of a time constraint and a resource constraint.

In a seventeenth aspect according to any of the previous aspects (e.g., the sixteenth aspect), the resource constraint includes (i) removing the assignment of the particular MDS when an amount of available memory for the MDS falls below a predetermined threshold and (ii) removing the assignment of the particular MDS when a cache of the particular MDS is cleared.

In an eighteenth aspect according to any of the previous aspects (e.g., the sixteenth aspect), the time constraint includes at least one of (i) a predetermined amount of time passing after assigning the particular MDS to store and manage metadata for the subdirectory and (ii) a predetermined amount of time passing after receiving a request for metadata associated with the subdirectory.

In a nineteenth aspect according to any of the previous aspects (e.g., the fourteenth aspect), the particular MDS ceases to be assigned to store and manage metadata for the subdirectory after receiving a request that identifies (i) the respective subnode and (ii) a different MDS from among the plurality of MDSs.

In a twentieth aspect according to any of the previous aspects (e.g., the fourteenth aspect), the hashing is a consistent hashing operation performed based on a quantity of the plurality of MDSs.

In a twenty-first aspect according to any of the previous aspects (e.g., the twentieth aspect), the identifier of the respective subnode is a numerical identifier of the respective subnode within the file system tree.

In a twenty-second aspect according to any of the previous aspects (e.g., the twenty-first aspect), the numerical identifier is an inode identifier of the respective subnode within the file system tree.

In a twenty-third aspect according to any of the previous aspects (e.g., the fourteenth aspect), assigning the particular MDS to store and manage metadata for the subdirectory includes updating directory metadata associated with the subdirectory.

In a twenty-fourth aspect according to any of the previous aspects (e.g., the fourteenth aspect), the instructions further cause the processor to receive a request identifying a distributed policy.

In a twenty-fifth aspect according to any of the previous aspects (e.g., the twenty-fourth aspect), the request includes the identifier of the base directory.

In a twenty-sixth aspect according to any of the previous aspects (e.g., the fourteenth aspect), the plurality of MDSs are implemented as part of a metadata cluster assigned to manage metadata for the file system tree.

In a twenty-seventh aspect, a non-transitory, computer-readable medium is provided storing instructions which, when executed by a processor, cause the processor to receive an identifier of a base directory within a file system tree and identify a plurality of subnodes of the base directory within the file system tree. The instructions may also cause the processor to temporarily pin at least a subset of the subnodes to a plurality of metadata servers (MDSs) by, for each respective subnode of the at least a subset of the subnodes, hashing an identifier of the respective subnode to generate a hashed value corresponding to a particular MDS and assigning the particular MDS to store and manage metadata for a subdirectory associated with the respective subnode.

In a twenty-eighth aspect, a system is provided that includes receiving means for receiving an identifier of a base directory within a file system tree and identifying means for identifying a plurality of subnodes of the base directory within the file system tree. The system may also include pinning means for temporarily pinning at least a subset of the subnodes to a plurality of metadata servers (MDSs) by, for each respective subnode of the at least a subset of the subnodes, hashing an identifier of the respective subnode to generate a hashed value corresponding to a particular MDS and assigning the particular MDS to store and manage metadata for a subdirectory associated with the respective subnode.

In a twenty-ninth aspect, a method is provided that includes receiving an identifier of a new directory within a file system tree and performing a probabilistic check to determine whether a subnode corresponding to the new directory should be pinned. Responsive to determining that the subnode should be pinned, the subnode may be temporarily pinned to a particular metadata server (MDS) from among a plurality of MDSs by hashing an identifier of the subnode to generate a hashed value corresponding to the particular MDS and assigning the particular MDS to store and manage metadata for the new directory.

In a thirtieth aspect according to any of the previous aspects (e.g., the twenty-ninth aspect), the new directory is at least one of a newly-created directory within the tree and a newly-loaded directory.

In a thirty-first aspect according to any of the previous aspects (e.g., the thirtieth aspect), the new directory is a child directory of a base directory associated with a random policy and the random policy is configured to randomly pin a proportion of a plurality of child directories of the base directory.

In a thirty-second aspect according to any of the previous aspects (e.g., the thirty-first aspect), the probabilistic check includes randomly generating a number and comparing the number to the proportion.

In a thirty-third aspect according to any of the previous aspects (e.g., the twenty-ninth aspect), the particular MDS is temporarily assigned to manage metadata for the new directory.

In a thirty-fourth aspect according to any of the previous aspects (e.g., the thirty-third aspect), the particular MDS ceases to be assigned to store and manage metadata for the new directory based on one or more of a time constraint and a resource constraint.

In a thirty-fifth aspect according to any of the previous aspects (e.g., the thirty-fourth aspects), the resource constraint includes (i) removing the assignment of the particular MDS when an amount of available memory for the MDS falls below a predetermined threshold and (ii) removing the assignment of the particular MDS when a cache of the particular MDS is cleared.

In a thirty-sixth aspect according to any of the previous aspects (e.g., the thirty-fourth aspects), the time constraint includes at least one of (i) a predetermined amount of time passing after assigning the particular MDS to store and manage metadata for the new directory and (ii) a predetermined amount of time passing after receiving a request for metadata associated with the new directory.

In a thirty-seventh aspect according to any of the previous aspects (e.g., the twenty-ninth aspect), the particular MDS ceases to be assigned to store and manage metadata for the new directory after receiving a request that identifies (i) the subnode corresponding to the new directory and (ii) a different MDS from among the plurality of MDSs.

In a thirty-eighth aspect according to any of the previous aspects (e.g., the twenty-ninth aspect), hashing is a consistent hashing operation performed based on a quantity of the plurality of MDSs.

In a thirty-ninth aspect according to any of the previous aspects (e.g., the thirty-eighth aspect), the identifier of the subnode is a numerical identifier of the subnode within the file system tree.

In a fortieth aspect according to any of the previous aspects (e.g., the thirty-ninth aspect), the numerical identifier is an inode identifier of the subnode within the file system tree.

In a forty-first aspect according to any of the previous aspects (e.g., the twenty-ninth aspect), assigning the particular MDS to store and manage metadata for the new directory includes updating directory metadata associated with the new directory.

In a forty-second aspect according to any of the previous aspects (e.g., the twenty-ninth aspect), the plurality of MDSs are implemented as part of a metadata cluster assigned to manage metadata for the file system tree.

In a forty-third aspect, a system is provided that includes a processor and a memory. The memory may store instructions which, when executed by the processor, cause the processor to receive an identifier of a new directory within a file system tree and perform a probabilistic check to determine whether a subnode corresponding to the new directory should be pinned. Responsive to determining that the subnode should be pinned, the instructions may cause the processor to temporarily pin the subnode to a particular metadata server (MDS) from among a plurality of MDSs by hashing an identifier of the subnode to generate a hashed value corresponding to the particular MDS and assigning the particular MDS to store and manage metadata for the new directory.

In a forty-fourth aspect according to any of the previous aspects (e.g., the forty-third aspect), the new directory is at least one of a newly-created directory within the tree and a newly-loaded directory.

In a forty-fifth aspect according to any of the previous aspects (e.g., the forty-third aspect), the new directory is a child directory of a base directory associated with a random policy. The random policy may be configured to randomly pin a proportion of a plurality of child directories of the base directory.

In a forty-sixth aspect according to any of the previous aspects (e.g., the forty-fifth aspect), the probabilistic check includes randomly generating a number and comparing the number to the proportion.

In a forty-seventh aspect according to any of the previous aspects (e.g., the forty-third aspect), the particular MDS is temporarily assigned to manage metadata for the new directory.

In a forty-eighth aspect according to any of the previous aspects (e.g., the forty-seventh aspect), the particular MDS ceases to be assigned to store and manage metadata for the new directory based on one or more of a time constraint and a resource constraint.

In a forty-ninth aspect according to any of the previous aspects (e.g., the forty-eighth aspect), the resource constraint includes (i) removing the assignment of the particular MDS when an amount of available memory for the MDS falls below a predetermined threshold and (ii) removing the assignment of the particular MDS when a cache of the particular MDS is cleared.

In a fiftieth aspect according to any of the previous aspects (e.g., the forty-eighth aspect), the time constraint includes at least one of (i) a predetermined amount of time passing after assigning the particular MDS to store and manage metadata for the new directory and (ii) a predetermined amount of time passing after receiving a request for metadata associated with the new directory.

In a fifty-first aspect according to any of the previous aspects (e.g., the forty-third aspect), the particular MDS ceases to be assigned to store and manage metadata for the new directory after receiving a request that identifies (i) the subnode corresponding to the new directory and (ii) a different MDS from among the plurality of MDSs.

In a fifty-second aspect according to any of the previous aspects (e.g., the forty-third aspect), the hashing is a consistent hashing operation performed based on a quantity of the plurality of MDSs.

In a fifty-second aspect according to any of the previous aspects (e.g., the fifty-second aspect), the identifier of the subnode is a numerical identifier of the subnode within the file system tree.

In a fifty-fourth aspect according to any of the previous aspects (e.g., the fifty-third aspect), the numerical identifier is an inode identifier of the subnode within the file system tree.

In a fifty-fifth aspect according to any of the previous aspects (e.g., the forty-third aspect), assigning the particular MDS to store and manage metadata for the new directory includes updating directory metadata associated with the new directory.

In a fifty-sixth aspect according to any of the previous aspects (e.g., the forty-third aspect), the plurality of MDSs are implemented as part of a metadata cluster assigned to manage metadata for the file system tree.

In a fifth-seventh aspect, a non-transitory, computer-readable medium is provided storing instructions which, when executed by a processor, cause the processor to receive an identifier of a new directory within a file system tree and perform a probabilistic check to determine whether a subnode corresponding to the new directory should be pinned. Responsive to determining that the subnode should be pinned, the instructions may further cause the processor to temporarily pin the subnode to a particular metadata server (MDS) from among a plurality of MDSs by hashing an identifier of the subnode to generate a hashed value corresponding to the particular MDS and assigning the particular MDS to store and manage metadata for the new directory.

In a fifty-eighth aspect, a system is provided that includes a receiving means for receiving an identifier of a new directory within a file system tree and a checking means for performing a probabilistic check to determine whether a subnode corresponding to the new directory should be pinned. The system may also include a pinning means for, responsive to determining that the subnode should be pinned, temporarily pinning the subnode to a particular metadata server (MDS) from among a plurality of MDSs by hashing an identifier of the subnode to generate a hashed value corresponding to the particular MDS and assigning the particular MDS to store and manage metadata for the new directory.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving an identifier of a base directory within a file system tree, wherein the base directory is associated with a random policy;
identifying a plurality of subnodes of the base directory within the file system tree; and
temporarily pinning at least a subset of the subnodes to a plurality of metadata servers (MDSs) by, for each respective subnode of the at least a subset of the subnodes:
hashing an identifier of the respective subnode to generate a hashed value corresponding to a particular MDS; and
assigning the particular MDS to store and manage metadata for a subdirectory associated with the respective subnode,
wherein the subdirectory is a child directory of the base directory, wherein the random policy is configured to randomly pin a plurality of child directories of the base directory.

2. The method of claim 1, wherein the particular MDS is temporarily assigned to manage metadata for the subdirectory.

3. The method of claim 2, wherein the particular MDS ceases to be assigned to store and manage metadata for the subdirectory based on one or more of a time constraint and a resource constraint.

4. The method of claim 3, wherein the resource constraint includes (i) removing the assignment of the particular MDS when an amount of available memory for the MDS falls below a predetermined threshold and (ii) removing the assignment of the particular MDS when a cache of the particular MDS is at least partially cleared.

5. The method of claim 3, wherein the time constraint includes at least one of (i) a predetermined amount of time passing after assigning the particular MDS to store and manage metadata for the subdirectory and (ii) a predetermined amount of time passing after receiving a request for metadata associated with the subdirectory.

6. The method of claim 1, wherein the particular MDS ceases to be assigned to store and manage metadata for the subdirectory after receiving a request that identifies (i) the respective subnode or a parent node of the respective subnode and (ii) a different MDS from among the plurality of MDSs.

7. The method of claim 1, wherein the hashing is a consistent hashing operation performed based on a quantity of the plurality of MDSs.

8. The method of claim 7, wherein the identifier of the respective subnode is a numerical identifier of the respective subnode within the file system tree.

9. The method of claim 8, wherein the numerical identifier is an inode identifier of the respective subnode within the file system tree.

10. The method of claim 1, wherein assigning the particular MDS to store and manage metadata for the subdirectory includes updating directory metadata associated with the subdirectory.

11. The method of claim 1, further comprising receiving a request including an identifier of the base directory and identifying at least one of (i) a distributed policy and (ii) a conditional distributed policy.

12. The method of claim 1, wherein the plurality of MDSs are implemented as part of a metadata cluster assigned to manage metadata for the file system tree.

13. A system comprising:
a processor; and
a memory storing instructions which, when executed by the processor, cause the processor to:
receive an identifier of a new directory within a file system tree;
perform a probabilistic check to determine whether a subnode corresponding to the new directory should be pinned, wherein the new directory is a child directory of a base directory associated with a random policy, wherein the random policy is configured to randomly pin a proportion of a plurality of child directories of the base directory; and
responsive to determining that the subnode should be pinned, temporarily pin the subnode to a particular metadata server (MDS) from among a plurality of MDSs by:
hashing an identifier of the subnode to generate a hashed value corresponding to the particular MDS; and
assigning the particular MDS to store and manage metadata for the new directory.

14. The system of claim 13, wherein the new directory is at least one of a newly-created directory within the file system tree and a newly-loaded directory within the file system tree.

15. The system of claim 13, wherein the probabilistic check includes randomly generating a number and comparing the number to the proportion.

16. The system of claim 13, wherein the particular MDS ceases to be assigned to store and manage metadata for the new directory based on one or more of a time constraint and a resource constraint.

17. The system of claim 13, wherein the particular MDS ceases to be assigned to store and manage metadata for the new directory after receiving a request that identifies (i) the subnode corresponding to the new directory or a parent node of the subnode and (ii) a different MDS from among the plurality of MDSs.

18. The system of claim 13, wherein the hashing is a consistent hashing operation performed based on a quantity of the plurality of MDSs and an inode identifier of the subnode within the file system tree.

19. A non-transitory, computer-readable medium storing instructions which, when executed by a processor, cause the processor to:

receive an identifier of a new directory within a file system tree;

perform a probabilistic check to determine whether a subnode corresponding to the new directory should be pinned, wherein the new directory is a child directory of a base directory associated with a random policy, wherein the random policy is configured to randomly pin a proportion of a plurality of child directories of the base directory; and responsive to determining that the subnode should be pinned, temporarily pin the subnode to a particular metadata server (MDS) from among a plurality of MDSs by:

hashing an identifier of the subnode to generate a hashed value corresponding to the particular MDS; and assigning the particular MDS to store and manage metadata for the new directory.

* * * * *